Sept. 1, 1936.  S. T. ROBINSON  2,053,048

COVER FASTENING

Filed Sept. 25, 1934

INVENTOR.
S. T. ROBINSON.
BY
ATTORNEYS.

Patented Sept. 1, 1936

2,053,048

UNITED STATES PATENT OFFICE 2,053,048

COVER FASTENING

S. T. Robinson, Hillsboro, Ill., assignor to Curtiss-Wright Airplane Company, a corporation of Missouri Application September 25, 1934, Serial No. 745,398

2 Claims. (Cl. 244—31)

This invention relates to aircraft, and is particularly concerned with the attachment of covering skin to the aircraft structure.

An object of the invention is to provide means for smoothly attaching the skin of an aircraft to its supporting structure, to substantially eliminate the protuberances resulting from prior methods of attachment.

A further object is to provide skin attaching means which may be used with greater speed and which results in a neater, smoother final assembly.

Still another object is to provide skin attaching means which is particularly adapted for attaching a fabric skin to the fuselage and/or airfoil surfaces of an aircraft.

Another object is to provide a method of attaching fabric to a rigid element.

Generally, the invention includes a fairing element, rib or the like, having a grooved or concave outer surface, and a strip of fabric stretched over the groove longitudinally of the element. The edges of the strip are folded down over the sides of the element, and are attached thereto as by staples, tacks or the like. The fairing element may be made of wood, or may be made of metal, in which case the strip is attached thereto by other suitable means. The fabric skin is stretched over one or more of the fairing elements in the usual manner, a reinforcing tape is laid over the skin over each element, and attachment of the skin to the element is effected by serving a thread through the reinforcing tape, skin and strip longitudinally of the element so that the upper stitches lie over the skin and the lower stitches lie under the strip and within the groove of the element. The groove provides clearance for a suitable curved needle when sewing down toward the element, the needle passing along the groove prior to coming up through the layers of fabric to allow a suitable length of stitch. When completed, the thread will lie close to the skin and parallel with the element, resulting in a smooth final attachment.

Since prior methods of skin attachment involved sewing transversely of and around the element, and since frequently the individual stitches were knotted on the outer skin surface, it is apparent that the new method is a distinct improvement.

Further objects will be apparent, and the details of the invention will be more clearly understood, by referring to the following detailed description and drawing, in which.

Figure 1:
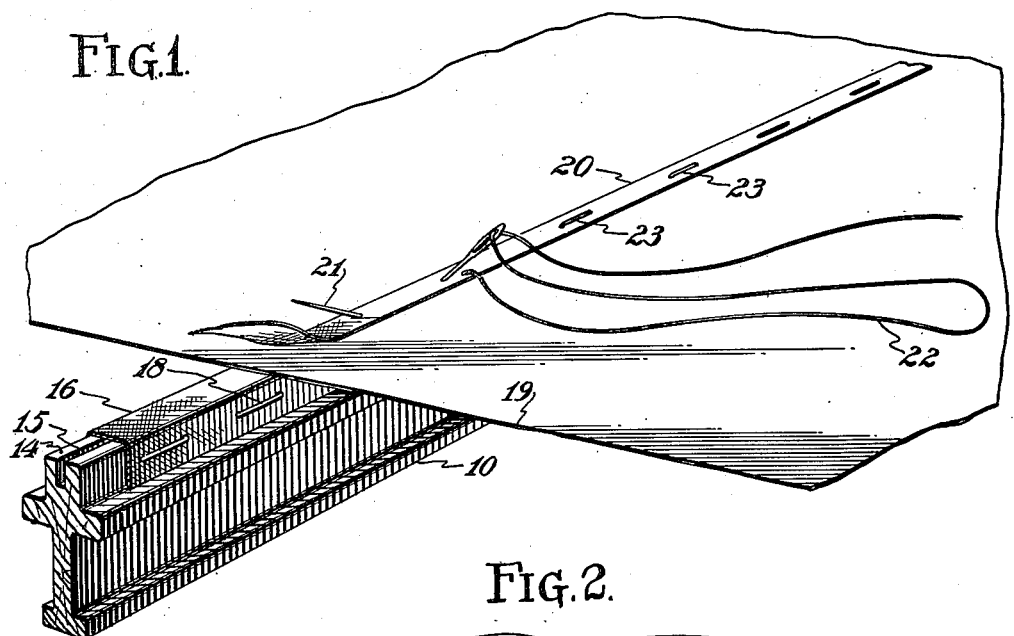
Fig. 1 is a perspective view of a fairing element and a portion of covering skin showing the method of attachment of the latter.
Figure 2:
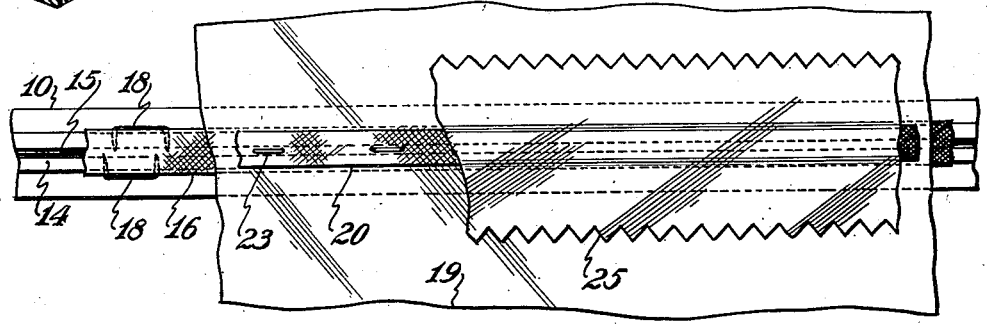
Fig. 2 is a plan of a fairing element and an attached portion of skin.
Figure 3:
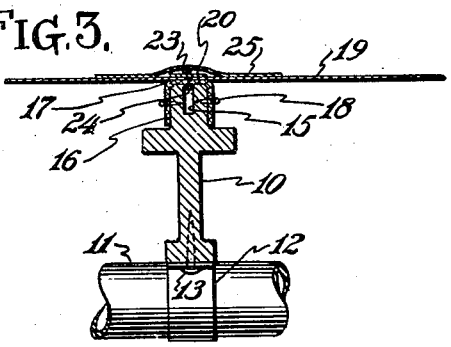
Fig. 3 is a section through the element with the skin attached.

The element 10 is preferably made of wood, and represents a fuselage fairing, a rib chord element or the like. It may be attached to a main structural element 11 by a strap 12 through which a screw 13 passes to enter into the element 11. The upper surface 14 of the element 10 is provided with a groove, or concavity 15, throughout its length, and a fabric strip 16 is laid over the surface 14 and is folded down over the sides of the element, as at 17. Staples 18 or other suitable means are passed through the sides of the strip and into the element 10, firmly anchoring the strip to the element. A fabric skin 19 is stretched over the element 10 in the usual manner, the strip 16 lying between the skin and element, and the usual reinforcing tape 20 is laid over the skin, directly over and parallel to the element 10.

Now, a curved needle 21, having a thread 22 threaded into the eye thereof, is passed downwardly through the tape 20, skin 19, strip 16, the point of the needle being directed along the groove 15, the needle then being directed upwardly through the strip, skin and tape. Thus, upper stitches 23 are formed over the skin and tape, running parallel to the element, and lower stitches 24 are formed below the strip 16, lying within the groove 15, these also running parallel to the element.

Finally, the skin surface is doped and the usual pinked edge tape 25 is cemented by the dope over the skin, tape and stitching. The final seam is thus smooth and uniform throughout its length, being uninterrupted longitudinally by transverse sewing threads or knots.

The method proposed also permits rapid attachment of the skin to the structural elements, eliminating the time consuming knotting of threads and the inaccurate stitching resultant from the use of the hook needles used with the older method.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In an aircraft structure including a fabric covering overlying a support, said support comprising a channel section having its spaced apart flanges facing outwardly, a fabric tape overlying the open side of said channel section, embracing the sides of and attached to said support, said covering lying adjacent said tape, and stitching extending substantially centrally over said channel section and joining said tape and said covering, the groove of said channel section forming clearance below said tape to receive the lower run of said stitching, and whereby, in sewing said tape, a curved needle may be passed from without, through said covering and tape, into said groove and thence out through said tape and covering for maintaining uniformly spaced stitching.

2. In an aircraft structure including a fabric covering overlying a support, said support comprising a channel section having its spaced apart flanges facing outwardly, a fabric perforatable tape overlying the open side of said channel section, embracing the sides of and attached to said support, said covering lying adjacent said tape, and stitching extending along said channel and joining said tape and said covering, the groove of said channel section forming clearance below said tape to receive the lower run of said stitching.

S. T. ROBINSON.